United States Patent
Shen (10) Patent No.: US 11,061,595 B2
(45) Date of Patent: Jul. 13, 2021

(54) LOGICAL ADDRESS REMAPPING FOR DIRECT WRITE

(71) Applicant: Seagate Technology LLC, Cupertino, CA (US)

(72) Inventor: JinQuan Shen, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/409,088

(22) Filed: May 10, 2019

(65) Prior Publication Data

US 2020/0356295 A1 Nov. 12, 2020

(51) Int. Cl.
*G06F 3/06* (2006.01)
*G06F 13/40* (2006.01)
*G06F 12/10* (2016.01)
*G06F 12/1045* (2016.01)
*G06F 12/1036* (2016.01)

(52) U.S. Cl.
CPC .......... *G06F 3/0644* (2013.01); *G06F 3/0611* (2013.01); *G06F 3/0656* (2013.01); *G06F 3/0674* (2013.01); *G06F 12/1036* (2013.01); *G06F 12/1045* (2013.01); *G06F 13/4063* (2013.01)

(58) Field of Classification Search
None
See application file for complete search history.

(56) References Cited

U.S. PATENT DOCUMENTS

| | | | |
|---|---|---|---|
| 7,827,328 B2 | 11/2010 | Machcha et al. | |
| 8,687,303 B2 | 4/2014 | Hall | |
| 8,699,175 B1 * | 4/2014 | Olds | G11B 5/012 360/78.14 |
| 8,756,382 B1 | 6/2014 | Carlson et al. | |
| 8,756,399 B2 | 6/2014 | Feldman | |
| 8,922,930 B1 * | 12/2014 | Weikal | G11B 20/10527 360/60 |
| 9,454,990 B1 | 9/2016 | Fukuhisa | |
| 9,864,529 B1 * | 1/2018 | Chen | G06F 3/0619 |
| 10,108,545 B2 | 10/2018 | Han et al. | |

(Continued)

OTHER PUBLICATIONS

Wang, Chunling et al., "Larger, Cheaper, but faster: SSD-SMR Hybrid Storage Boosed by a New SMR-oriented Cache Framework", Key Laboratory of Data Engineering and Knowledge Engineering, MOE School of Information, Renmin University of China, Beijing, China, Corresponding author: ypchai@ruc.edu.cn, 2017, 16 pages.

*Primary Examiner* — Kaushikkumar M Patel
(74) *Attorney, Agent, or Firm* — Westman, Champlin & Koehler, P.A.

(57) ABSTRACT

A method of writing to a data storage drive having a first media partition having a first write speed and a second media partition having a second write speed slower than the first write speed includes mapping a plurality of logical block addresses (LBAs) to a plurality of physical block addresses (PBAs) of the first media partition, and writing to the plurality of LBAs mapped to the PBAs of the first media partition. It is determined whether the first media partition is at or above a predetermined storage level, and, when the first media partition is at or above the predetermined storage level, data is moved moving data from the first media partition to a plurality of PBAs in the second media partition, and mapping of LBAs and PBAs in the data storage device is updated.

20 Claims, 5 Drawing Sheets

(56) References Cited

U.S. PATENT DOCUMENTS

| | | | |
|---|---|---|---|
| 2009/0157940 A1* | 6/2009 | Sanvido | G06F 3/0611 711/5 |
| 2010/0329092 A1* | 12/2010 | Ueno | G06F 3/0656 369/47.34 |
| 2012/0300328 A1* | 11/2012 | Coker | G11B 5/012 360/31 |
| 2013/0083416 A1 | 4/2013 | Kasiraj et al. | |
| 2013/0268718 A1 | 10/2013 | Hall | |
| 2014/0055881 A1 | 2/2014 | Zaharris | |
| 2014/0254042 A1 | 9/2014 | Yeo et al. | |
| 2014/0281186 A1* | 9/2014 | Gaertner | G06F 3/0659 711/104 |
| 2014/0281194 A1* | 9/2014 | Gaertner | G06F 3/064 711/105 |
| 2015/0109700 A1* | 4/2015 | Kashiwase | G11B 5/09 360/77.04 |
| 2015/0160882 A1* | 6/2015 | Coker | G06F 3/0626 711/111 |
| 2015/0255115 A1* | 9/2015 | Pantel | G06F 3/0619 360/48 |
| 2016/0117121 A1* | 4/2016 | Bohn | G06F 3/064 711/114 |
| 2016/0148643 A1* | 5/2016 | Gao | G11B 20/1217 369/13.35 |
| 2016/0224260 A1* | 8/2016 | Bandic | G11B 20/1217 |
| 2017/0083438 A1* | 3/2017 | Han | G06F 3/0659 |
| 2018/0046382 A1* | 2/2018 | Liu | G06F 3/0646 |
| 2018/0260159 A1 | 9/2018 | Hall | |
| 2018/0260332 A1* | 9/2018 | Dunn | G06F 3/0659 |
| 2018/0342261 A1 | 11/2018 | Das | |
| 2019/0013046 A1* | 1/2019 | Kulkarni | G06F 12/10 |
| 2019/0042111 A1* | 2/2019 | Garcia | G06F 11/1471 |
| 2019/0079859 A1* | 3/2019 | Li | G11C 16/3495 |
| 2019/0278710 A1* | 9/2019 | Ehrlich | G06F 12/0871 |
| 2019/0286355 A1* | 9/2019 | Bhagwat | G06F 3/0604 |
| 2020/0201549 A1* | 6/2020 | Malina | G06F 3/0659 |

* cited by examiner

LOGICAL ADDRESS REMAPPING FOR DIRECT WRITE

SUMMARY

In one embodiment, a method of writing to a data storage drive having a first media partition having a first write speed and a second media partition having a second write speed slower than the first write speed includes mapping a plurality of logical block addresses (LBAs) to a plurality of physical block addresses (PBAs) of the first media partition, and writing to the plurality of LBAs mapped to the PBAs of the first media partition. It is determined whether the first media partition is at or above a predetermined storage level, and, when the first media partition is at or above the predetermined storage level, data is moved from the first media partition to a plurality of PBAs in the second media partition, and mapping of LBAs and PBAs in the data storage device is updated.

In another embodiment, a method of writing to a data storage drive having a shingled media partition and an unshingled media partition (UMP) includes mapping a plurality of logical block addresses (LBAs) to a plurality of physical block addresses (PBAs) of the UMP, and writing to the plurality of LBAs mapped to the PBAs of the UMP. It is determined whether the UMP is at or above a predetermined storage level, and, when the UMP is at or above the predetermined storage level, data is moved from the UMP to a plurality of PBAs in the shingled media partition, the plurality of LBAs mapped to the PBAs of the UMP are remapped to the plurality of PBAs in the shingled media partition is remapped, and a new plurality of LBAs to the plurality of PBAs of the UMP is mapped.

In yet another embodiment, a device includes a first data storage partition having a first write speed, a second data storage partition having a second write speed slower than the first write speed, and controller. The controller is configured to process incoming data writes to the device according to a method including mapping a plurality of logical block addresses (LBAs) to a plurality of physical block addresses (PBAs) of the first media partition, writing to the plurality of LBAs mapped to the PBAs of the first media partition, and determining whether the first media partition is at or above a predetermined storage level. When the first media partition is at or above the predetermined storage level, the controller is further configured to move data from the first media partition to a plurality of PBAs in the second media partition, remap the plurality of LBAs mapped to the PBAs of the first media partition to the plurality of PBAs in the second media partition, and map a new plurality of LBAs to the plurality of PBAs of the first media partition.

Other features and benefits that characterize embodiments of the disclosure will be apparent upon reading the following detailed description and review of the associated drawings.

DETAILED DESCRIPTION

Embodiments of the present disclosure provide a plurality of logical block addresses (LBAs) assigned to physical block addresses (PBAs) of a first media partition of a storage device capable of quickly writing the data, such as in a non-overlapping track media partition, sometimes referred to as an unshingled media partition. Incoming writes made to LBAs of the first media partition are written quickly to that portion. When a threshold level of storage in the first media partition is reached, transfer is made of that data to a second media partition that has a slower write speed than the first media partition, such as a shingled magnetic recording (SMR) media partition of the storage device. The LBAs originally assigned to the first media partition are remapped to point to PBAs of the second media partition of the storage device where the data has been transferred. A new set of LBAs is mapped to the first media partition, and data write requests to the storage device directed to those new LBAs are written in the same fashion as before, until the first media partition threshold is again reached. In this way, the logical space of the UMP is mutable and the PBAs of the UMP portion are mutably mapped to by a wider range of LBAs, to reduce problems with write amplification. The LBAs are in one embodiment host LBAs.

In a hard disc drive (HDD) that has a single partition of overlapping magnetic recording (e.g., shingled magnetic recording (SMR)), when a host controller provides data to be written to the drive in a non-sequential format, data is not written directly to the drive. Instead, the data is often written to a media cache (MC) first. Once data is written to the MC, it is sorted for transfer into a main storage area of the HDD with SMR in a band rewrite operation. This process results in some instances in write amplification. In this process, the write operation is amplified to multiple writes and read processes in order to write the data into the main storage area of the HDD. If the MC gets full, or is approaching being full, the nature of overlapping writing can severely slow the write process down.

While SMR has increased areal density on storage devices, when a host attempts a write to an SMR device with non-sequential data writes, the data is first written to a buffer such as a MC as described above. This buffer may also be a non-SMR portion of a device, such as an unshingled media partition (UMP) that performs writes in a non-sequential way, and thus writes quickly. The buffers and UMP portions of storage devices are relatively small. When the buffer is full, transferring data to the SMR portion can suffer from extreme slowdowns due to the sequential nature of writing to an SMR portion of the device.

Hybrid storage drives, containing portions of non-overlapping write areas and portions of overlapping write areas, may be used to handle some address space that a host controller sends frequent write commands to, especially when the write commands are sent to the address space randomly. When a host writes to LBAs which are mapped to the non-overlapping portion of the storage device, that data may be written directly to that area, since fast random writes are supported in a non-overlapping write area. Such non-overlapping portions of storage devices are typically on the order of 30-40 gigabytes in size for a one terabyte HDD. Large amounts of random writes can quickly fill or nearly fill such a non-overlapping portion of a HDD, leading also to slow performance on writing due to band-rewriting to an overlapping portion of the HDD. While increasing the size of the non-overlapping portion of the HDD could reduce this issue, density limitations limit such space, and as the partition size of non-overlapping portions of a HDD increase, product yield drops.

The size of the non-overlapping portion of hybrid storage drives is easily taxed when large updates to software, such as for example only, operating system updates, occur. Such updates typically have large amounts of data that are written to random areas, and can overwhelm non-overlapping portions of HDDs, leading to large decreases in performance. As operating system updates can already take rather large amounts of time, reduced performance of a data storage device for such updates further increases the already long time used for updates.

Embodiments of the present disclosure provide methods for movably mapping logical address space in a hybrid data storage device to increase write performance. In one embodiment, a hybrid data storage device comprises a first data storage area media partition and a second data storage area media partition. The first data storage area media partition has a write speed faster than a write speed of the second data storage area media partition. Data to be written to the data storage device, sent from a host controller, is written to the first data storage area media partition until such partition is full or nearly full, and then transferred to the second data storage area media partition. LBAs for the first data storage area media partition are remapped to the physical block addresses of the data transferred to the second data storage area media partition, and a new set of LBAs is mapped to the first data storage area media partition for future write commands from the host controller. Moving of the original logical address space to another logical address space to support direct write in the new logical address space to the faster writing portion of the data storage device reduces write amplification and improves write performance to the data storage device.

Figure 1:
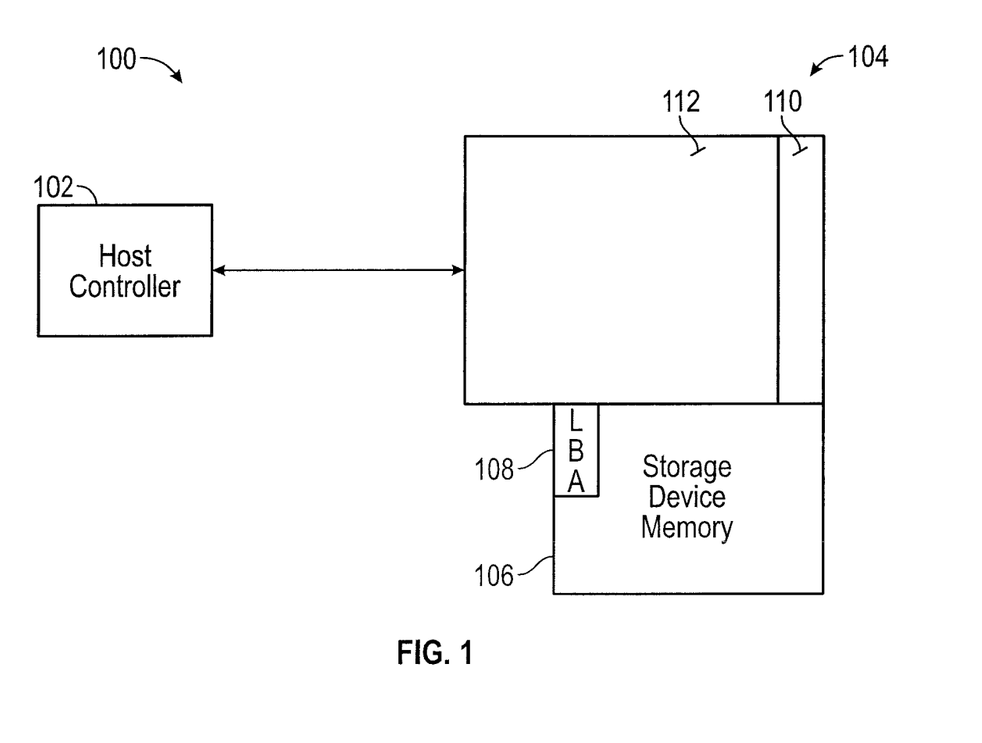
FIG. 1 is a block diagram of a system on which embodiments of the present disclosure may be practiced.

Referring to FIG. 1, an embodiment of a system 100 capable of practicing embodiments of the present disclosure is shown in block diagram form. System 100 comprises a host controller 102 in communication with a storage device 104. Storage device 104 includes memory 106 which stores an LBA table 108. Storage device in one embodiment has a first media partition 110 and a second media partition 112. The first media partition 110 operates at a first write speed, and the second media partition operates at a second, slower write speed than the first media partition 110. Device memory 106 may be partially volatile memory, such as dynamic random access memory (DRAM) or the like, and partially non-volatile memory, such as Flash memory or the like.

Examples of media partitions having different write speeds include, by way of example only and not by way of limitation, a standard memory partition that writes in non-overlapping fashion versus a media partition that writes in an overlapping fashion. Non-overlapping writing includes unshingled media (e.g., non-overlapping tracks and non-sequential writing) in one embodiment. Overlapping writing includes shingled magnetic recording (SMR) in one embodiment. Alternate partition types may include MC, Flash memory, drive HDD, solid state drive (SSD) media and the like. In the case of any type of hybrid storage device, that is, a storage device with two different write speed media partitions, embodiments of the present disclosure may be employed.

When data is to be written to a storage device, the host controller 102 sends data to be written to the storage device 104. Data may be buffered in one embodiment in a portion of the memory 106, or may be directly written to one of the media partitions 110 or 112. Embodiments of the present disclosure maintain a table 108 of LBAs that are associated with physical block addresses (PBAs) of the storage device. In one embodiment, the initial table 108 contains LBAs that are mapped to physical block addresses (PBAs) of the first media partition, which is capable of direct writes in random fashion.

Figure 2:
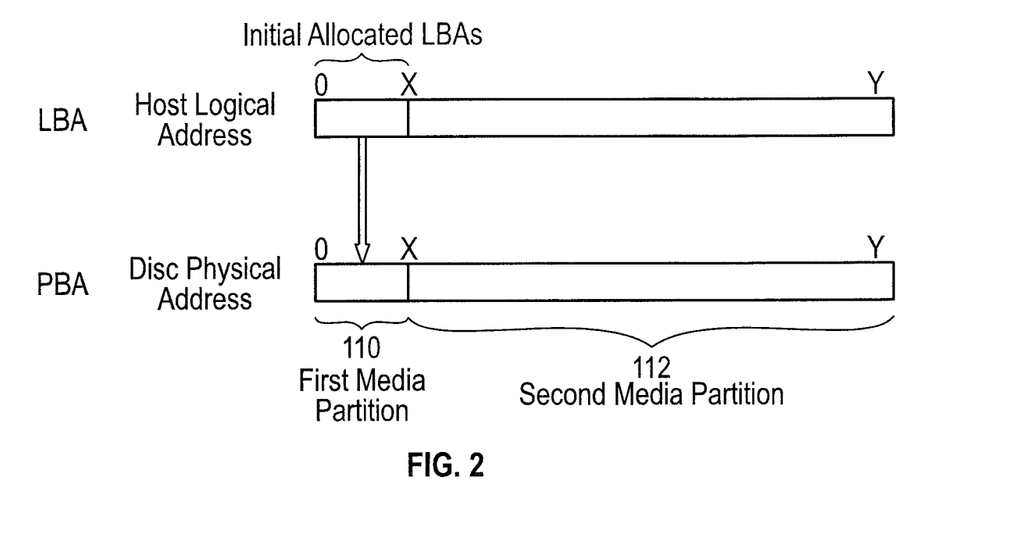
FIG. 2 is a block diagram of a logical to physical map according to an embodiment of the present disclosure.

Referring to FIG. 2, upon first use of a storage device such as device 104, a first set of PBAs 0 - - - X of the physical space of the storage device, in the first media partition 110, are allocated/mapped to logical address space identified by LBAs 0 - - - X. In one embodiment, the first media partition is an unshingled media partition, and the second media partition 112 is a shingled media partition. However, it should be understood that the embodiments of the disclosure are amenable to first and second media partitions that have different write speeds, where the first media partition is capable of quicker write processes, and where the first media partition 110 has PBAs to which the initial LBAs are assigned.

When the host 102 sends random write requests to the storage device 104, the storage device writes the data to the first media partition 110 according to the allocation/mapping of LBAs 0 - - - X to PBAs 0 - - - X. When the first media partition 110 is full or nearly full, as determined by meeting a threshold storage level that may be set as the user desires, the data in the physical space in the first media partition 110 that is associated with LBAs 0 - - - X is moved to an area of the second media partition 112, retaining its LBA allocation/mapping of 0 - - - X, whereas the physical space of the first media partition 110 is allocated/mapped to a new set of LBAs. This is shown in greater detail in FIG. 3

Figure 3:
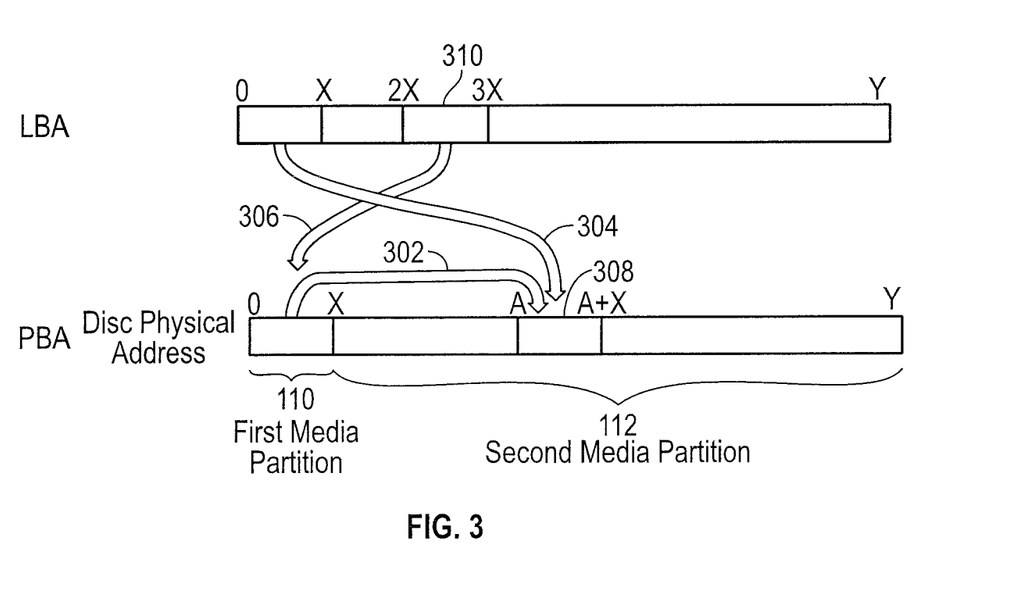
FIG. 3 is a block diagram of a logical to physical map according to an embodiment of the present disclosure.

Referring to FIG. 3, when the first media partition 110 is full or has reached its threshold storage level, the data in the first media partition is moved to a space in the second media partition. This is indicated at arrow 302 of FIG. 3. The data from the first media partition 110 is moved to area 308 of second media partition 112, at PBAs A - - - A+X. In one embodiment, the second media partition 112 is a shingled media partition and the transfer of data as shown in arrow 302 is performed to move the data in the first media partition 110 to PBAs A - - - A+X in area 308 of the second media partition 112. This is performed in one embodiment in a write operation if area 308 is empty, or in a band rewrite operation to the SMR portion 308 if not empty.

Once the physical data is moved from the first media partition 110 to the area 308 of the second media partition 112, a mapping change for LBAs 0 - - - X is made. LBAs 0 - - - X are pointed to the new area 308 at PBAs A - - - A+X as shown at arrow 304. Once this remapping of LBAs is complete, a new set of LBAs 310, for example from LBAs 2 X - - - 3X, are pointed to the PBAs 0 - - - X of the first media partition as shown at arrow 306. When the host 102 sends subsequent random write requests to the storage device 104, the storage device writes the data to the first media partition 110 according to the mapping of LBAs 2 X - - - 3X to PBAs 0 - - - X. In this way, host write requests that are sent randomly are allocated to the faster writing first media partition 110, allowing direct write capability to storage device 104 even when the amount of data to be written exceeds the physical storage limits of the first media partition 110.

As write commands from host 102 fill the first media partition 110, or substantially fill the first media partition 110, prior to the moving of data from the first media partition 110 to the second media partition 112, writes to the logical space 0 - - - X will be for small amounts of data, whereas larger amount of data will be directed to be written to logical address space 2 X - - - 3X, so that the more active write requests are mapped to the faster media partition 110 which supports direct write operations.

In one embodiment, the transfer of data from the first media partition 110 to the area 308 of the second media partition 112 is performed when the storage device is at idle. However, it should be understood that data transfer may also be made during normal operation provided the proper mapping is maintained, and without departing form the scope of the disclosure. Transfer speeds within storage devices are typically sufficiently fast to allow transfer of data from the first media partition 110 to the second media partition 112 without significantly affecting write speed, even to the faster write speed media partition 110.

Figure 4:
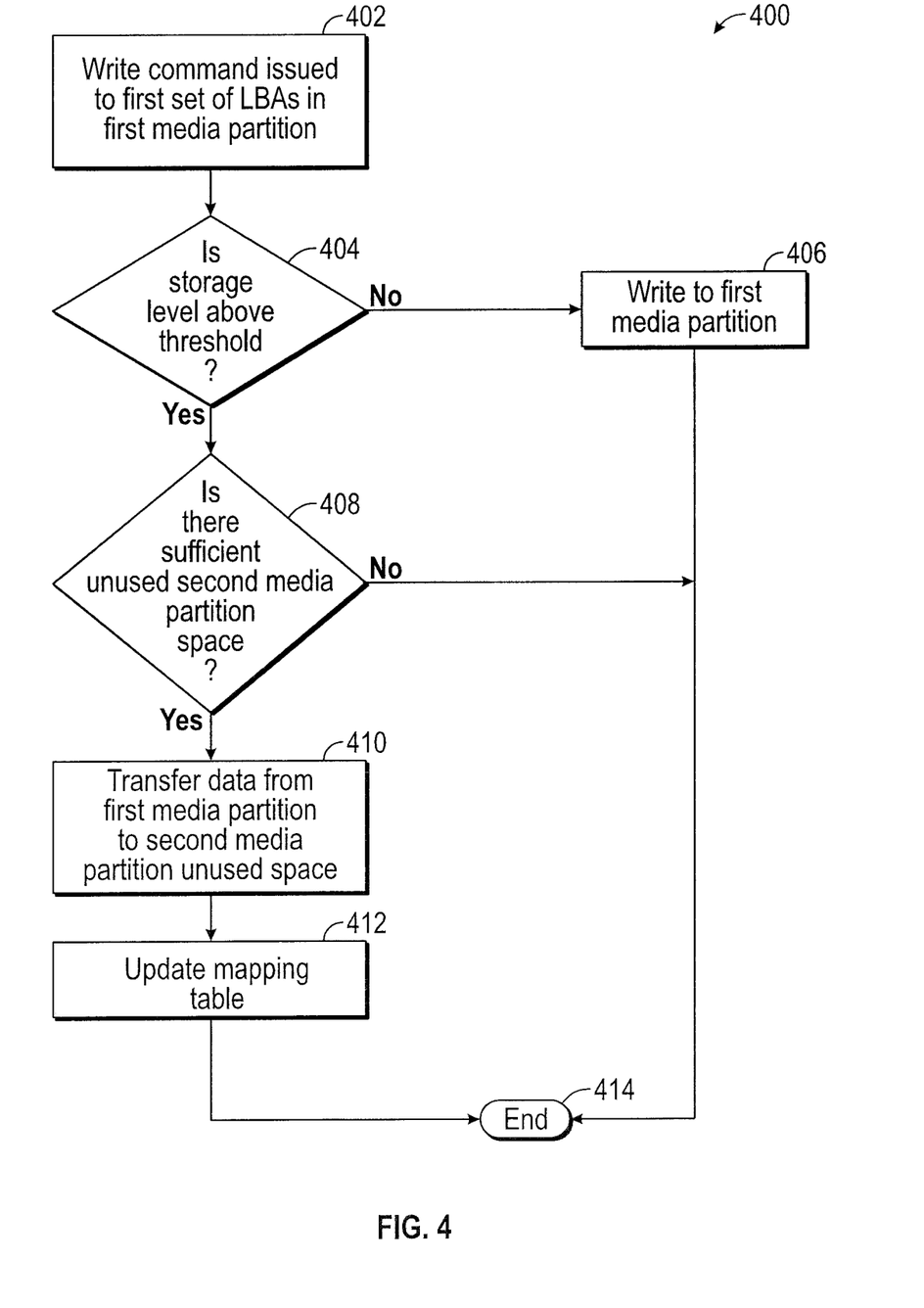
FIG. 4 is a flow chart diagram of a method according to an embodiment of the present disclosure.

FIG. 4 is a flow chart diagram of a method 400 according to an embodiment of the present disclosure. In method 400, a write command is issued in block 402 to a first set of LBAs associated with the first media partition. In decision block 404, a determination is made as to whether the first media partition has available space, either above a threshold storage level, or full. If the first media partition has sufficient space for the write, the method continues with writing the data to the first media partition at block 406. If the first media partition storage level exceeds a predetermined level, the a determination is made in decision block 408 as to whether there is sufficient unused space in the second media partition for the data in the first media partition. If there is not, the method ends at block 414, and normal storage device operation continues. If there is sufficient physical storage space available in the second media partition, as determined in decision block 408, then the data from the first media partition is transferred to the second media partition in block 410, and mapping of LBAs and PBAs in the storage device is updated in block 412 (e.g., update the mapping table 108), after which the process ends until another write command is issued. Transfer of data from the first media partition to the second media partition as in block 410 may be accomplished at storage device idle, or during normal operation.

Figure 5:
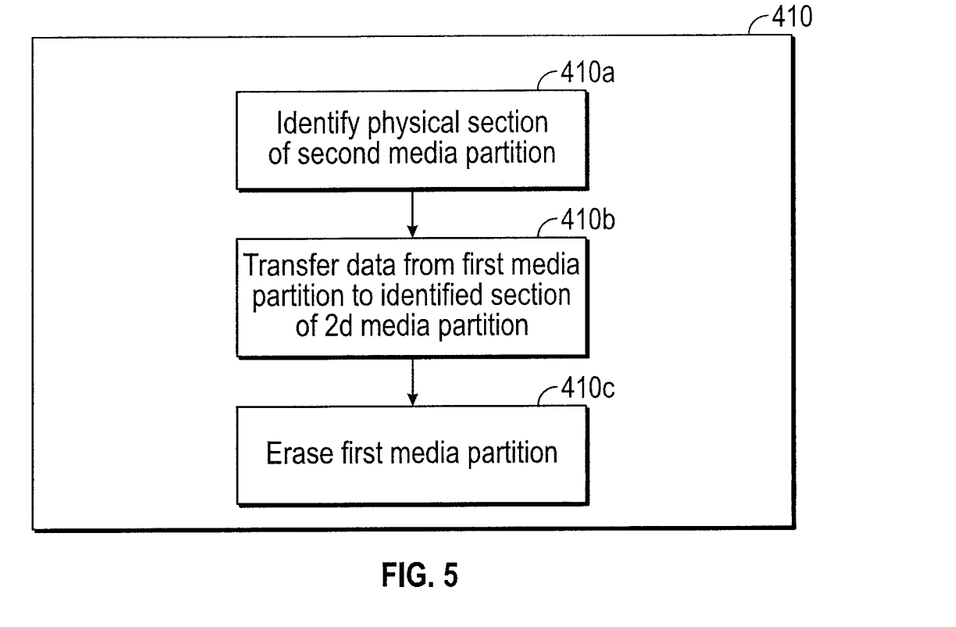
FIG. 5 is a more detailed flow chart diagram of a portion of the method of FIG. 4.

FIG. 5 is a more detailed flowchart of block 410. In block 410 in one embodiment, a physical section of the second media partition corresponding to an amount of physical storage equivalent to that of the first media partition, and having a PBA range the same length as the PBA range of the first media partition, is identified in block 410a. In block 410b, data is transferred from the first media partition to the PBAs assigned and determined in block 410a. In optional block 410c, the first media partition is erased before new data is written thereto if the type of memory dictates an erasure prior to the writing of new data.

Figure 6:
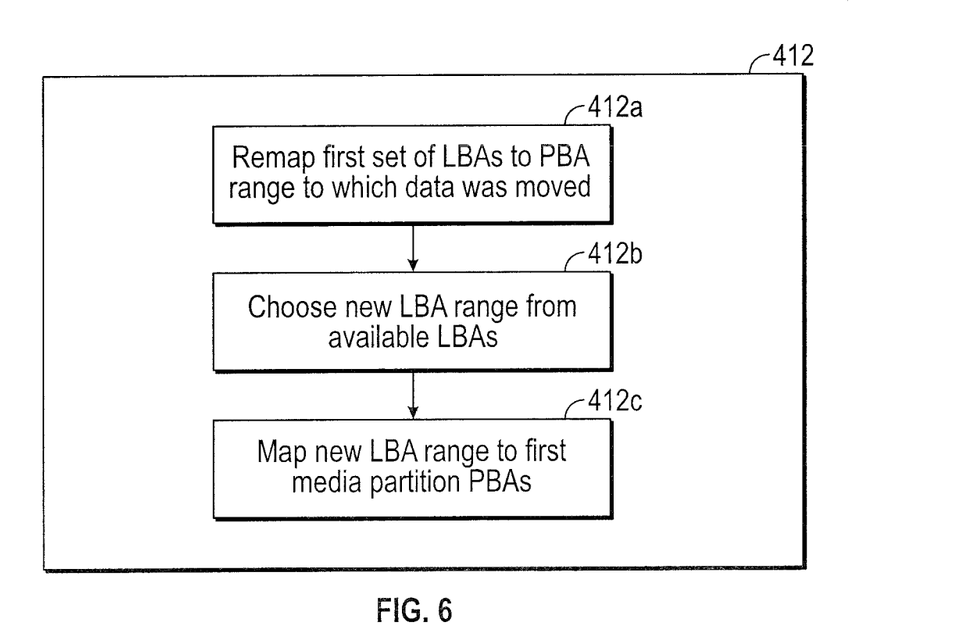
FIG. 6 is a more detailed flow chart diagram of a portion of the method of FIG. 4.

FIG. 6 is a more detailed flowchart of block 412. In block 412 in one embodiment, the first set of LBAs in a first LBA range is remapped in block 412a to point to the new PBA range to which data was transferred in block 410. In block 412b, a new LBA range corresponding in size to the first LBA range is chosen from available LBAs. The new LBA range is mapped in block 412c to point to the first media partition PBAs.

Although the first media partition 110 has been described as an unshingled media partition, and the second media partition 112 has been described as a shingled media partition, it should be understood that the embodiments of the present disclosure may be applied to any system in which one portion of a storage device has a slower write speed than a second portion of the storage device. For example, a solid-state memory may be used as the first media partition, and an SMR as the second media partition. Any media partition or cache that can act as a buffer or a random write area may be used as described herein for transfer to a slower writing portion (e.g., an SMR) to obtain the benefit of direct write speeds, even for large amounts of random data writes.

Figure 7:
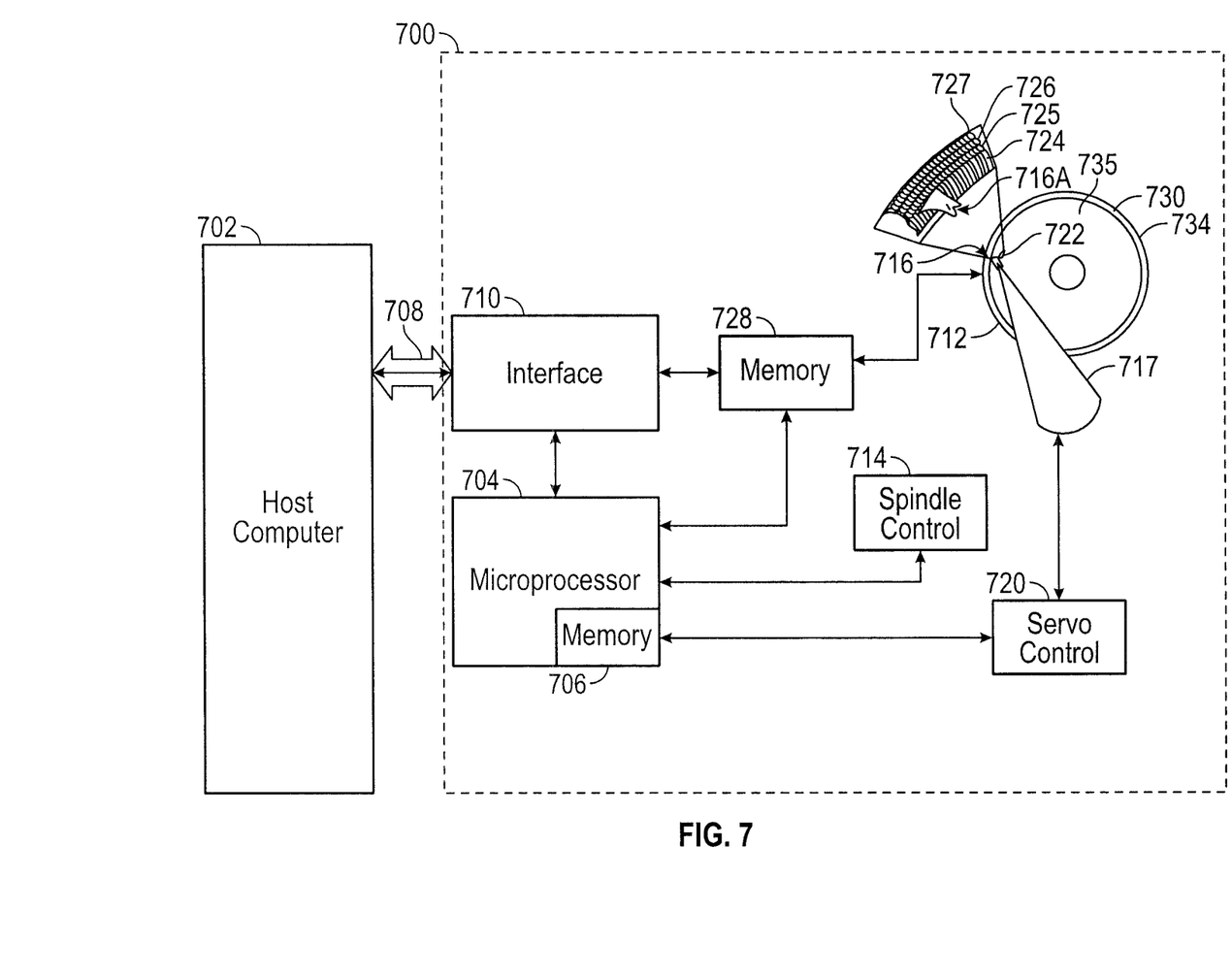
FIG. 7 is a block diagram of a data storage device in accordance with one embodiment.

FIG. 7 shows a block diagram of a disc drive 700 in accordance with one embodiment. Disc drive 700 is a particular example of a data storage or memory device 104. As will be described in detail further below, in one embodiment disc drive 700 employs one or more discs on which multiple data tracks may be written in a partially-overlapping shingled pattern, with each successive track overwriting a portion of the previous track. The discs may be hybrid discs having one partition where no data tracks are written in a partially-overlapping shingled pattern, and a larger partition having data tracks all written in a partially-overlapping shingled pattern.

Disc drive 700 is shown in FIG. 7 to be operably connected to a host computer 702 in which disc drive 700 may be mounted. Disc drive 700 includes a microprocessor 704 that generally provides top level communication and control for disc drive 700 in conjunction with programming for microprocessor 704 stored in microprocessor memory 706. Disc drive 700 may communicate with host computer 702 using a bus 708.

Memory 706 can include random access memory (RAM), read only memory (ROM), and other sources of resident memory for microprocessor 704. Disc drive 700 includes one or more data storage discs 712. Discs 712 are rotated at a substantially constant high speed by a spindle control circuit 714. One or more heads 716 communicate with the surface(s) of discs 712 to carry out data read/write operations. The radial position of heads 716 is controlled through the application of current to a coil in an actuator assembly 717. A servo control system 720 provides such control.

As noted above, in some embodiments, tracks may be written on one or more storage discs 712 in a partially-overlaying relationship. The overlaying of tracks is shown in close-up view of area 722 of disc(s) 712. In area 722, a corner of head 716A is shown writing a track portion 724. Different shading within the track portion 724 represents different magnetic orientations that correspond to different values of stored binary data. The track portion 724 is overlaid over part of track portion 725. Similarly, track portion 725 is overlaid over part of portion 726, portion 726 is overlaid over portion 727, etc.

The portions 724-727 may be part of what is referred to herein as a physical band which, in this embodiment, may include tens, hundreds or thousands of similarly overlapping, concentric portions 724-727. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 724, 725, 726, 727, for example, are smaller than a width of a write pole (not separately shown) of head 716. However, a width of a reader (not separately shown) of head 716 may be small enough to read individual track portions 724, 725, 726, 727, thereby enabling random reads of data to be carried out. As described above in connection with FIGS. 2-6, methods for writing to the SMR portion from a non-SMR portion may be used on disc 700.

In certain embodiments, disc drive 700 includes a memory 728. In some embodiments, memory 728 is physically separate from discs 712. The memory 728 may be of a different type than the discs 712. For example, in certain embodiments, memory 728 may be constructed from solid-state components. In one embodiment, memory 728 may be a Flash memory. In such an embodiment, the Flash memory may include a plurality of programmable devices that are capable of storing data. A plurality of physical erasure blocks are within each of the devices, and each physical erasure block has physical pages of transistors. The Flash memory may be logically organized as a plurality of stripes where each stripe may include one or more physical erasure blocks or physical pages from multiple devices. The physical erasure blocks and/or stripes may be managed as physical bands and therefore may be a part of what are referred herein as physical bands. Memory 728 may be used, for example, for buffering write requests outside of the LBA range currently allocated to partition 730 of the data storage device 700.

In some embodiments, the one or more storage discs 712 are managed as non-overlapping disc portion 730 and another disc portion 735 (e.g., an overlapping or SMR portion). Disc portion 730 may be non-shingled (e.g., element 730 may include tracks that are each of a sufficiently large width relative to the width of the write pole of head 716 to allow the write pole to write data to individual ones of the tracks without overwriting data in any adjacent tracks).

Disc drive 700 may use memory 728 in conjunction with disc portion 730 in order to manage data as the data is being transferred to main storage locations 735 on disc(s) 712. In the interest of simplification, components such as a read/write channel which encodes data and provides requisite write current signals to heads 716 is not shown in FIG. 7. Also, any additional buffers that may be employed to assist in data transfer to the memory 728 and to disc partitions 730 and 735 are not shown in the interest of simplification.

The physical bands of drive 700 may be utilized in a manner described above in connection with FIGS. 2-6, where data is written to area 730 until a threshold storage level in area 730 has been reached, followed by transfer of the data from area 730 to a portion of area 735, and remapping as described herein.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of writing to a data storage drive having a first media partition having a first write speed and a second media partition having a second write speed slower than the first write speed, comprising:
   assigning and mapping a plurality of host logical block addresses (LBAs) to a plurality of physical block addresses (PBAs) of the first media partition;
   upon receipt of a random write request to the plurality of host LBAs assigned and mapped to the plurality of PBAs of the first media partition, writing to the first media partition according to the mapping of the plurality of host LBAs to the PBAs of the first media partition;
   determining whether the first media partition is at or above a predetermined storage level; and
   when the first media partition is at or above the predetermined storage level, moving data from the first media partition to a plurality of PBAs in the second media partition; and
   updating mapping of host LBAs and PBAs in the data storage device.

2. The method of claim 1, wherein updating mapping comprises:
   remapping the plurality of host LBAs preassigned and mapped to the plurality of PBAs of the first media partition to the plurality of PBAs in the second media partition; and
   assigning and mapping a new plurality of host LBAs to the plurality of PBAs of the first media partition.

3. The method of claim 1, wherein writing to the plurality of LBAs assigned and mapped to the PBAs of the first media partition comprises writing to an unshingled media partition.

4. The method of claim 1, wherein moving data from the first media partition to a plurality of PBAs in the second media partition comprises moving the data to a sequentially written media partition.

5. The method of claim 1, wherein moving data comprises moving data from the first media partition to the second media partition when an idle condition is detected in the data storage device.

6. The method of claim 1, wherein moving data comprises moving data from the first media partition to the second media partition immediately upon the predetermined storage level being reached.

7. The method of claim 1, wherein moving data from the first media partition to a plurality of PBAs in the second media partition comprises:
   identifying a physical section of the second media partition having a PBA range the same length as and having an amount of physical storage equivalent to that of the first media partition; and
   transferring data from the first media partition to the physical section of the second media partition.

8. The method of claim 7, wherein updating mapping of LBAs and PBAs in the data storage device comprises:
   remapping the first set of LBAs in a first LBA range to point to the new PBA range to which data was transferred;
   selecting a new LBA range corresponding in size to the first LBA range of available LBAs; and
   assigning and mapping the new LBA range to point to the first media partition PBAs.

9. A method of writing to a data storage drive having a shingled media partition and an unshingled media partition (UMP), comprising:
   preassigning and mapping a plurality of host logical block addresses (LBAs) to a plurality of physical block addresses (PB As) of the UMP;
   upon receipt of a random write request to the plurality of host LBAs preassigned and mapped to the plurality of PBAs of the first media partition, writing to the PBAs of the UMP assigned and mapped to the plurality of host LBAs;
   determining whether the UMP is at or above a predetermined storage level; and
   when the UMP is at or above the predetermined storage level, moving data from the UMP to a plurality of PBAs in the shingled media partition, remapping the plurality of host LBAs assigned and mapped to the PBAs of the UMP to the plurality of PBAs in the shingled media partition, and assigning and mapping a new plurality of host LBAs to the plurality of PBAs of the UMP.

10. The method of claim 9, wherein moving data comprises moving data from the first media partition to the second media partition when an idle condition is detected in the data storage device.

11. The method of claim 9, wherein moving data comprises moving data from the first media partition to the second media partition immediately upon the predetermined storage level being reached.

12. The method of claim 9, wherein writing to the plurality of LBAs assigned and mapped to the PBAs of the first media partition comprises writing to an unshingled media partition, and wherein moving data from the first media partition to a plurality of PBAs in the second media partition comprises moving the data to a sequentially written media partition.

13. A device, comprising:
a first data storage partition having a first write speed;
a second data storage partition having a second write speed slower than the first write speed; and
a controller, the controller configured to process incoming data writes to the device according to a method comprising:
assigning and mapping a plurality of host logical block addresses (LBAs) to a plurality of physical block addresses (PBAs) of the first media partition;
upon receipt of a random write request to the plurality of host LBAs assigned and mapped to the plurality of PBAs of the first media partition, writing to the plurality of LBAs assigned and mapped to the PBAs of the first media partition;
determining whether the first media partition is at or above a predetermined storage level; and
when the first media partition is at or above the predetermined storage level, moving data from the first media partition to a plurality of PBAs in the second media partition, remapping the plurality of host LBAs assigned and mapped to the PBAs of the first media partition to the plurality of PBAs in the second media partition, and assigning and mapping a new plurality of host LBAs to the plurality of PBAs of the first media partition.

14. The device of claim 13, wherein the first data storage partition is an unshingled media partition, and the second data storage partition is a sequentially written media partition.

15. The device of claim 14, wherein the second data storage partition is a shingled media partition.

16. The device of claim 13, wherein the first data storage partition is a solid state drive partition.

17. The device of claim 13, wherein the first data storage partition is a media cache.

18. The device of claim 13, wherein the device has a media cache, and wherein the media cache is used as the first data storage partition.

19. The device of claim 13, wherein the controller is further configured to move data from the first media partition to a plurality of PBAs in the second media partition by:
identifying a physical section of the second media partition having a PBA range the same length as and having an amount of physical storage equivalent to that of the first media partition; and
transferring data from the first media partition to the physical section of the second media partition.

20. The device of claim 19, wherein the controller is further configured to update mapping of LBAs and PBAs in the data storage device by:
remapping the first set of LBAs in a first LBA range to point to the new PBA range to which data was transferred;
selecting a new LBA range corresponding in size to the first LBA range of available LBAs; and
assigning and mapping the LBA range to point to the first media partition PBAs.

\* \* \* \* \*

UNITED STATES PATENT AND TRADEMARK OFFICE
CERTIFICATE OF CORRECTION

PATENT NO. : 11,061,595 B2
APPLICATION NO. : 16/409088
DATED : July 13, 2021
INVENTOR(S) : JinQuan Shen Page 1 of 1

It is certified that error appears in the above-identified patent and that said Letters Patent is hereby corrected as shown below:

In the Claims

Column 8, Claim 9, Line 58, please replace the word "(PB As)" with the word --(PBAs)--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*